United States Patent [19]

Matumura

[11] Patent Number: 5,015,679

[45] Date of Patent: May 14, 1991

[54] POLYOLEFIN COMPOSITION

[75] Inventor: Tooru Matumura, Kanagawa, Japan

[73] Assignee: Tonen Sekiyukagagaku K.K., Tokyo, Japan

[21] Appl. No.: 359,532

[22] Filed: Jun. 1, 1989

Related U.S. Application Data

[62] Division of Ser. No. 143,984, Jan. 14, 1988, Pat. No. 4,857,230.

[30] Foreign Application Priority Data

Jan. 23, 1987 [JP] Japan .................................. 62-12484

[51] Int. Cl.⁵ ...................... C08K 5/34; C08K 5/3432; C08K 5/3492
[52] U.S. Cl. ................................. 524/99; 252/400.24; 524/100; 524/126; 524/128; 524/424
[58] Field of Search ..................... 252/400.24; 524/99, 524/100

[56] References Cited

U.S. PATENT DOCUMENTS

| | | | |
|---|---|---|---|
| 3,382,199 | 5/1968 | Scullin ....................... | 252/400.24 X |
| 3,880,773 | 4/1975 | White et al. ............... | 252/400.24 X |
| 3,886,114 | 5/1975 | Beadle ........................ | 252/400.24 X |
| 4,302,383 | 11/1981 | Valdiserri et al. ......... | 252/400.24 X |
| 4,611,024 | 9/1986 | Wolfe .............................. | 524/354 X |
| 4,670,489 | 6/1987 | Takahashi et al. ......... | 252/400.24 X |
| 4,857,230 | 8/1989 | Matsumura ................... | 252/400.24 |

FOREIGN PATENT DOCUMENTS 17443 2/1974 Japan .
160333 9/1983 Japan .

*Primary Examiner*—Richard D. Lovering
*Attorney, Agent, or Firm*—M. B. Kurtzman; T. D. Simmons

[57] ABSTRACT

Polyolefin material having improved resistance to heat and discoloration comprising amount of a stabilizing composition said stabilizing composition comprising a relatively high molecular weight hindered amine compound and an organic phosphorus compound having relatively low hygroscopicity and a hydrotalcite.

11 Claims, No Drawings

POLYOLEFIN COMPOSITION

DETAILED DESCRIPTION OF THE INVENTION

1. Field of the Invention

This invention relates to a polyolefin composition and more particularly to a polyolefin composition capable of producing formed articles of polyolefin such as polyolefin fibers which possess an improved ability to resist heat and discoloration.

2. Description of the Prior Art

Heretofore, for the prevention of polyolefins such as polyethylene and polypropylene from deterioration by heat and oxygen, the practice of separate or collective addition of a phenol type stabilizer, a phosphorus type stabilizer, and a sulfur type stabilizer has been in vogue.

When such polyolefins are used in the field of textile materials such as, for example, clothes, filtering materials, and civil engineering materials, they entail a disadvantage that their working properties such as thermal stability are degraded because the stabilizers incorporated therein are extracted by liquids used for dry cleaning or laundering clothes, various solvents (filtrates) used for cleaning filtering materials, or plain water used for washing civil engineering materials. For the purpose of enabling the polyolefins to retain their working properties intact for a long time, the polyolefins require to incorporate therein such stabilizers in a large amount. When the textile articles are compelled to incorporate such stabilizers in a large amount, they entail a disadvantage that they are discolored by aging or by exposure to combustion gas or nitrogen oxides in the air.

To preclude this discoloration, a composition produced for the purpose of protecting textile articles from the discoloration by adding 3,4,5,6-dibenzo-1,2-oxa-phosphan-2-oxide, trilauryl trithiophosphite, benzoic acid, etc. to polypropylene incorporating therein a phenyl type antioxidant has been proposed (Japanese Patent Application Disclosure No. SHO 49(1974)-17,443). Since this composition still uses a phenol type stabilizer, a substance capable of causing discoloration and coloration, it is not sufficiently effective in resisting discoloration.

As means of preventing polyolefin fibers using no phenol type stabilizer from discoloration or coloration and imparting improved thermal stability to the polyolefin fibers, there have been proposed a composition produced by adding a hindered amine type compound and an organic phosphite compound to a polyolefin or a composition produced by further adding a thiodialkanoic ester (Japanese Patent Application Disclosure No. SHO 58(1983)-160,333).

PROBLEM FOR SOLUTION BY THE INVENTION

This invention aims to find a solution to the drawbacks suffered by the conventional polyolefin compositions proof against discoloration and provide a polyolefin composition capable of imparting to shaped articles of polyolefins such as polyolefin fibers a further improved ability to resist heat and discoloration.

INVENTION FOR THE SOLUTION OF THE PROBLEM

By the present invention, it has been ascertained that the object of this invention is accomplished by combined use of a high molecular weight type hindered amine type compound and a low-hygroscopicity organic phosphorus type compound plus additional incorporation of a hydrotalcite. This invention has been perfected as the result.

Specifically, the essence of this invention resides in a polyolefin composition which comprises 100 parts by weight of a polyolefin, (A) 0.05 to 1 part by weight of a hindered amine type compound, (B) 0.02 to 1 part by weight of an organic phosphorus type compound, and (C) 0.02 to 0.5 part by weight of hydrotalcite.

Concrete examples of the polyolefin contemplated by this invention include homopolymers and copolymers of such x-olefins as ethylene, propylene, butene-1, and 4-methyl-pentene-, copolymers of x-olefins as a major component and other monomers as a minor component, and mixtures of such polymers.

As examples of the hindered amine type compound contemplated by the present invention, there can be cited bis-(2,2,6,6-tetramethyl-4-piperidyl) sebacate, bis-(1,2,2,6,6-pentamethyl-4-piperidyl) sebacate, polycondensate of succinic acid with N-(2-hydroxyethyl)-4-hydroxy-2,2,6,6-tetramethyl piperidine, poly-([6-[(1,1,3,3-tetramethylbutyl)-imino]-1,3,5-triazine-2,4-diyl] [2-(2,2,6,6-tetramethyl-4-piperidyl)imino]-hexamethylene-[4-(2,2,6,6-tetramethyl-4-piperidyl)imino]), 1-[2-[3-(3,5-di-t-butyl-4-hydroxyphenyl)-propionyloxy]ethyl]-4-[3-(3,5-di-t-butyl-4-hydroxyphenyl)-propionyloxy]-2,2,6,6-tetramethyl piperidine, tetrakis (2,2,6,6-tetramethyl-4-piperidyl)-1,2,3,4-butane tetracarboxylic esters, tetrakis (1,2,2,6,6-pentamethyl-4-piperidyl)-1,2,3,4-butane tetracarboxylic esters, polycondensate of N,N'-bis(2,2,6,6-tetramethyl-4-piperidyl)-hexamethylene diamine with 1,2-dibromoethane, and polycondensate of 1,6-bis-(2,2,6,6-tetramethyl-4-piperidylamino)hexane with 2,4-dihalo-6-morpholino-1,3,5-triazine. In these hindered amino type compounds, those which possess average molecular weights exceeding 1,500 are used particularly advantageously. Especially, poly([6-((1,1,3,3-tetramethylbutyl)-imino]-1,3,5-triazine-2,4-diyl] [2-(2,2,6,6-tetramethyl-4-piperizyl)imino]-hexamethylene-[4-(2,2,6,6-tetramethyl-4-piperidyl)imino]), polycondensate of N,N'-bis-(2,2,6,6-tetramethyl-4-piperidyl)-hexamethylene diamine with 1,2-dibromoethane, and polycondensate of 1,6-bis(2,2,6,6-tetramethyl-4-piperidylamino)-hexane with 2,4-dihalo-6-morpholino-1,3,5-triazine are desirable.

The organic phosphorus type compound to be used in the present invention is desired to be usable as a phosphorus type antioxidant and to possess low hygroscopicity. As examples of the organic phosphorus type compound, there can be cited [4,4'-butylidene-bis-(3-methyl-6-t-butylphenyl-di-tridecyl)phosphite, 1,1,3-tris-(2-methyl-4-di-tridecyl phosphite-5-t-butyl)butane, cyclic neopentane tetrayl-bis(2,4-di-t-butylphenylphosphite)esters, bis(2,6-di-t-butyl-4-methylphenyl)pentaerythritol-di-di-phosphite, tris-(2,4-di-t-butylphenyl)-phosphite, bis-(3,5-di-t-butyl-4-hydroxybenzyl phosphoric ethyl)calcium, and tetrakis-(2,4-di-t-butylphenyl)-4,4-biphenylene diphosphonite. In all the organic phosphorus type compounds enumerated above, those possessing a hygroscopicity of not more than 5% by weight (as measured by 168 hours' standing at 40° C. and 90% of humidity) prove to be particularly desirable.

The hydrotalcite contemplated by the present invention is a hydrated basic carbonate of magnesium and aluminum or a homolog thereof containing no water of crystallization. It may be a natural product or synthetic product. The natural product of this compound is held to possess a structure, $Mg_6Al_2(OH)_{16}CO_3 \cdot 4H_2O$. Examples of the synthetic product include $Mg_{0.7}Al_{0.3}(OH)_2 \cdot (CO_3)_{0.15} \cdot 0.54H_2O$, $Mg_{4.5}Al_2(OH)_{13}CO_3 \cdot 3.5H_2O$, and $Mg_{4.2}Al_2(OH)_{12.4}CO_3$.

As concerns the amounts of the aforementioned stabilizer components in the polyolefin composition of the present invention, the amount of (A) the hindered amine type compound falls in the range of 0.05 to 1 part by weight preferably 0.1 to 0.5 part by weight and that of (B) the organic phosphorus type compound in the range of 0.02 to 1 part by weight, preferably 0.1 to 0.5 part by weight, respectively based on 100 parts by weight of polyolefin. If these amounts deviate from the ranges specified above, the object of this invention is not fully attained.

The polyolefin composition of the present invention is obtained by preparing the polyolefin, the hindered amine type compound, the organic phosphorus type compound, and the hydrotalcite in the proportions mentioned above and mixing them. The method by which this mixing is effected is not specifically limited. Any of the conventional methods available at all for the purpose of mixture can be adopted. Properly, the mixing can be effected by a method which comprises adding the stabilizer components to the polyolefin powder or pellets, mixing them preparatorily at normal room temperature, and then melting and kneading the mixture as with an extrusion molding machine.

The polyolefin composition of the present invention, when necessary, may incorporate therein such additives as ultraviolet absorbent, antistatic agent, neutralizing agent, pigment, and filler in addition to the aforementioned stabilizer components.

Now, the present invention will be described more specifically below with reference to working examples and comparative experiments.

EXAMPLES 1 THROUGH 10 AND COMPARATIVE EXPERIMENTS 1 THROUGH 14

In a Henschel mixer, 100 parts by weight of homopolypropylene possessing a melt flow rate of 20 g/10 min, varying proportions of hindered amine type compound (hereinafter referred to as "amine type compound"), organic phosphorus type compound (hereinafter referred to as "phosphorus type compound"), and hydrotalcite indicated in Table 1, and 0.1% by weight of calcium stearate as a neutralizing agent were premixed. The resultant mixture was melted, kneaded, and pelletize with an extruding machine at 230° C. The pellets were spun into 18-denier undrawn yarns with a melt spinning machine (using a circular spinneret) provided with a gear pump 25 mm in diameter, using a nonionic spinning oil and operated at a die temperature of 290° C. The undrawn yarns were drawn with a dry roll stretching machine to three times the original length at 90° C. in the presence of a nonionic surfactant, to produce 6-denier drawn yarns.

The drawn yarns were tested for thermal stability, discoloration by aging, and coloration by gas. The results are shown in Table 1. The tests were carried out by the following methods.

1. Untreated yarns

In a stainless steel capsule measuring 500 mm in diameter and 600 mm in depth and possessing 30 holes 10 mm in diameter and kept heated at 150° C. in a gear oven 20 g of the drawn yarns were left standing until they showed a visible sign of deterioration (discoloration or embrittlement), to clock the time required for the deterioration. The deterioration was rated on the five-point scale, wherein the double (◎) stands for at least 200 hours' standing, the circle (O) for not less than 120 hours' to less than 200 hours' standing, the triangle (Δ) for not less than 60 hours' to less than 120 hours' standing, the cross (×) for not less than 24 hours' to less than 60 hours' standing, and the (XX) for less than 24 hours' standing.

(2) Yarns treated with perchloroethylene

In a beaker containing 300 ml of perchloroethylene, 20 g of drawn yarns were kept immersed for 2 hours. The yarns were removed from the bath and dried in a drier tumbler. The dried drawn yarns were tested for thermal stability similarly to the untreated yarns indicated in (1) above.

(3) Yarns treated by washing

The drawn yarns were laundered by following the "Standard for Laundering Property with respect to Ability to Resist Flame" specified in Notice No. 11 from the Fire Defense Board.

Conditions: 15 minutes' (one time) standing in Marseilles soap at 60°, 5 minutes' (three times) rinsing at 40° C., 2 minutes' centrifugation for removal of water, and 25 minutes' drying in a drier tumbler at 60° C., in a washing tester for flame retardancy.

The drawn yarns which had undergone the laundering treatment described above were tested for thermal stability similarly to the untreated yarns indicated in (1) above.

2. Discoloration by aging:

Inside an oven kept at a constant temperature of 40° C. and a constant humidity of 90%, 10 g of the drawn yarns wrapped in gauze were suspended 80 mm above the liquid level of a 500-ml beaker containing 100 ml of an aqueous N/10 sodium hydroxide solution. After 840 hours' standing in the oven, the drawn yarns were visually examined as to change of color by aging.

The degree of coloration was rated on the five-point scale, wherein 1 stands for thorough coloration, 2 for appreciable coloration, 3 for rather conspicuous coloration, 4 for virtual absence of coloration, and 5 for absolute absence of coloration.

3. Coloration by gas:

A sample, i.e. 60 g of drawn yarns wrapped in gauze, was hung down from a support frame so that the wrapped sample be posed 1 m directly above the front side of a convection type kerosene stove, with the stove kept afire for five hours. At the end of the 5 hours' standing, the drawn yarns were visually examined as to change of color. The change of color was rated on the 5-point scale, wherein 1 stands for thorough coloration, 2 for appreciable coloration, 3 for rather conspicuous coloration, 4 for virtual absence of coloration, and 5 for absolute absence of coloration.

TABLE 1

| Stabilizer | | | Thermal stability (150° C.) | | | | |
|---|---|---|---|---|---|---|---|
| Amine type compound | Phosphorus type compound | Hydrotalcite and others | Untreated | Washed | Yarns treated | Discoloration | Coloration |

TABLE 1-continued

|  | Kind | Part | Kind | Part | Kind | Part | yarns | yarns | with perclene | by aging | by gas |
|---|---|---|---|---|---|---|---|---|---|---|---|
| Example |  |  |  |  |  |  |  |  |  |  |  |
| 1 | A1 | 0.1 | B1 | 0.1 | C1 | 0.1 | ◎ | ○ | ◎ | 5 | 5 |
| 2 | A1 | 0.4 | B1 | 0.1 | C1 | 0.1 | ◎ | ○ | ◎ | 5 | 5 |
| 3 | A2 | 0.1 | B1 | 0.1 | C1 | 0.1 | ◎ | ○ | ○ | 5 | 5 |
| 4 | A2 | 0.4 | B1 | 0.1 | C1 | 0.1 | ◎ | ○ | ◎ | 5 | 5 |
| 5 | A1 | 0.2 | B1 | 0.3 | C1 | 0.1 | ◎ | ◎ | ◎ | 5 | 5 |
| 6 | A2 | 0.2 | B1 | 0.3 | C1 | 0.1 | ◎ | ◎ | ◎ | 5 | 5 |
| 7 | A2 | 0.1 | B1 | 0.4 | C1 | 0.1 | ◎ | ○ | ◎ | 5 | 5 |
| 8 | A3 | 0.4 | B1 | 0.1 | C1 | 0.1 | ◎ | ○ | ○ | 5 | 5 |
| 9 | A1 | 0.4 | B1 | 0.1 | C2 | 0.1 | ◎ | ○ | ◎ | 5 | 4 |
| 10 | A1 | 0.2 | B1 | 0.2 | C2 | 0.2 | ◎ | ◎ | ◎ | 5 | 5 |
| 11 | A1 | 0.1 | B2 | 0.1 | C1 | 0.1 | ◎ | ○ | ◎ | 5 | 4 |
| 12 | A1 | 0.1 | B3 | 0.1 | C1 | 0.1 | ◎ | ○ | ◎ | 5 | 4 |
| 13 | A1 | 0.1 | B4 | 0.1 | C1 | 0.1 | ◎ | ○ | ◎ | 5 | 4 |
| Comparative Example |  |  |  |  |  |  |  |  |  |  |  |
| 1 | — | — | B1 | 0.2 | C1 | 0.1 | △ | X | X | 5 | 5 |
| 2 | A1 | 0.2 | — | — | C1 | 0.1 | ◎ | △ | ○ | 4 | 4 |
| 3 | A3 | 0.2 | — | — | C1 | 0.1 | ◎ | △ | △ | 4 | 4 |
| 4 | A3 | 0.1 | B1 | 0.2 | — | — | ◎ | △ | ○ | 4 | 4 |
| 5 | A1 | 0.3 | — | — | — | — | ◎ | △ | ○ | 4 | 4 |
| 6 | — | — | B1 | 0.3 | — | — | △ | X | X | 5 | 4 |
| 7 | A1 | 0.2 | — | — | D | 0.1 | ◎ | △ | △ | 4 | 4 |
| 8 | — | — | B1 | 0.2 | D | 0.1 | ◎ | X | X | 5 | 4 |
| 9 | A3 | 0.3 | — | — | — | — | ○ | △ | △ | 4 | 4 |
| 10 | — | — | B1 | 0.1 | E | 0.2 | ◎ | △ | X | 3 | 2 |
| 11 | A1 | 0.1 | — | — | E | 0.2 | ◎ | ○ | △ | 3 | 2 |

Stabilizers in Table 1

Amine type compound
A1 Poly [6-[(1,1,3,3-tetramethylbutyl)-imino]-1,3,5-triazine-2,4-diyl] [2-(2,2,6,6-tetramethyl-4-piperidyl) imino]-hexamethylene-[4-(2,2,6,6-Tetramethyl-4-piperidyl)imino])
(produced by Ciba Geigy and marketed under trademark designation of "Chimassorb LS944LD")
A2 Polycondensate of N,N'-bis-(2,2,6,6-tetramethyl-4-piperidyl)-hexamethylene diamine with 1,2-dibromoethane (produced by Montedison and marketed under trademark designation of "Spinuvex A36")
A3 Polycondensate of 1,6-bis-(2,2,6,6-tetramethyl-4-piperidylamino)-hexane with 2,4-dihalo-6-morpholino-1,3,5-triazine (produced by American cyanamid and marketed under trademark designation of "Cyasorb UV-3346")

Phosphorus type compound
B1 Cyclic neopentane tetrayl bis-(2,4-di-t-butyl phenyl-phosphite) ester
B2 [4,4'-Butylidene-bis-(3-methyl-6-t-butylphenyl-di-tridecyl) phosphite
B3 1,1,3-Tris-(2-methyl-4-di-tridecylphosphite-butyl) butane
B4 Bis-(3,5-di-t-butyl-4-hydroxybenzyl phosphoric ethyl) calcium Hydrotalcite
C1 Basic magnesium-aluminum-hydroxy-carbonate-hydrate
[possessing a structure of $Mg_{4.5}Al_2(OH)_{13}CO_3.3.5H_2O$)
C2 Basic magnesium-aluminum-hydroxy carbonate
(possessing a structure of $Mg_{4.2}Al_2(OH)_{12.4}CO_3$)

Others
D distearyl-3,3'-thiodipropionate
E Tetrakis[methylene(3,5-di-t-butyl-4-hydroxyhydrocinnamate)]methane

EFFECT OF THE INVENTION

The polyolefin composition of the present invention is such that the shaped articles such as polyolefin fibers produced thereof exhibit outstanding thermal stability as compared with the conventional countertypes for dry cleaning or laundering.

Further, these shaped articles possess a highly desirable ability to resist coloration due to exposure to combustion gas or to nitrogen oxides in the air.

Owing to the characteristics described above, the polyolefin composition of this invention is highly useful in the field of textile articles such as clothes, filtering materials, and civil engineering materials.

I claim:
1. Polyolefin material having improved resistance to heat and discoloration comprising a stabilizing amount of a stabilizing composition consisting of relatively high molecular weight hindered amine compound and an organic phosphorus compound having relatively low hygroscopicity, and a hydrotalcite.

2. Polyolefin material in accordance with claim 1 wherein said hindered amine is selected from the group consisting of bis-(2,2,6,6-tetramethyl-4-piperidyl) sebacate, bis-(1,2,2,6,6-pentamethyl-4-piperidyl) sebacate, polycondensate of succinic acid with N-(2-hydroxyethyl)-4-hydroxy-2,2,6,6-tetramethyl piperidine, poly-([6-[(1,1,3,3-tetramethylbutyl)-imino]-1,3,5-triazine-2,4-diyl][2-(2,2,6,6-tetramethyl-4-piperidyl)imino]-hexamethylene-[4-(2,2,6,6-tetramethyl-4-piperidyl)imino], 1-[2-[3-(3,5-di-t-butyl-4-hydroxyphenyl)-propionyloxy]ethyl]-4-[3-(3,5-di-t-butyl-4-hydroxyphenyl)-propionyloxy]-2,2,6,6-tetramethyl piperidine, tetrakis (2,2,6,6-tetramethyl-4-piperidyl)-1,2,3,4-butane tetracarboxylic esters, tetrakis (1,2,2,6,6-pentamethyl-4-piperidyl)-1,2,3,4-butane tetracarboxylic esters, polycondensate of N,N'-bis(2,2,6,6-tetramethyl-4-piperidyl)-hexamethylene diamine with 1,2-dibromoethane, and polycondensate of 1,6-bis-(2,2,6,6-tetramethyl-4-piperidylamino)hexane with 2,4-dihalo-6-morpholino-1,3,5-triazine.

3. Polyolefin material in accordance with claim 2 wherein said hindered amine is present in an amount of from about 0.05 to about 1 part by weight based on 100 parts by weight of a polyolefin to be stabilized.

4. Polyolefin material in accordance with claim 3 wherein said organic phosphorus compound is present in an amount of from about 0.02 to about 1 part by weight based on 100 parts by weight of a polyolefin to be stabilized.

5. Polyolefin material in accordance with claim 1 wherein said organic phosphorus compound is selected from the group consisting of 4,4'-butylidene-bis-(3-methyl-6-t-butylphenyl-di-tridecyl)-phosphite, 1,1,3-tris-(2-methyl-4-di-tridecyl phosphite-5-t-butyl) butane, cyclic neopentane tetrayl-bis(2,4-di-t-butylphenyl-phosphite) esters, bis(2,6-di-t-butyl-4-methylphenyl) pentaerythritol-di-phosphite, tris-(2,4-di-t-butylphenyl) phosphite, bis-(3,5-di-t-butyl-4-hydroxybenzyl phosphoric ethyl) calcium, and tetrakis-(2,4-di-t-butylphenyl)-4,4-biphenylene diphosphonite.

6. Polyolefin material in accordance with claim 5 wherein said organic phosphorus compound is characterized by having a hygroscopicity of not more than 5% by weight.

7. Polyolefin material in accordance with claim 6 wherein said organic phosphorus compound is present in an amount of from about 0.02 to about 1 part by weight based on 100 parts by weight of a polyolefin to be stabilized.

8. Polyolefin material in accordance with claim 1 wherein said hydrotalcite is selected from the group consisting of $Mg_6Al_2(OH)_{16}CO_3 \cdot 4H_2O$, $Mg_{0.7}Al_{0.3}(OH)_2(CO_3)_{0.15} \cdot 0.54H_2O$, $Mg_{4.5}Al_2(OH)_{13}CO_3 \cdot 3.5H_2O$, and $Mg_{4.2}Al_2(OH)_{12.4}CO_3$.

9. Polyolefin material in accordance with claim 8 wherein said hydrotalcite is present in an amount of from about 0.02 to about 0.5 part by weight based on 100 parts by weight of a polyolefin to be stabilized.

10. Formed articles of manufacture having an improved resistance to heat and discoloration comprising the polyolefin material of claim 1.

11. A textile material having improved resistance to heat and discoloration comprising a stabilizing amount of the composition of claim 1.

* * * * *